(12) United States Patent
Miyajima et al.

(10) Patent No.: US 6,466,383 B1
(45) Date of Patent: Oct. 15, 2002

(54) IMAGE PICKUP OPTICAL SYSTEM

(75) Inventors: Toru Miyajima, Hachioji; Takayoshi Togino, Koganei, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/672,499

(22) Filed: Sep. 29, 2000

(30) Foreign Application Priority Data

Oct. 1, 1999 (JP) ............................................. 11-281032

(51) Int. Cl.[7] .................................................. G02B 5/04
(52) U.S. Cl. ........................ 359/831; 359/837; 359/883; 359/834
(58) Field of Search ................................. 359/831, 837, 359/833, 834, 883, 631, 633, 637

(56) References Cited

U.S. PATENT DOCUMENTS 5,461,418 A * 10/1995 Shiraishi ..................... 348/291
6,023,373 A * 2/2000 Inoguchi et al. ............ 359/633
6,134,051 A * 10/2000 Hayakawa et al. ......... 359/630

FOREIGN PATENT DOCUMENTS

JP          10-333040          12/1998

* cited by examiner

Primary Examiner—Mohammad Sikder
(74) Attorney, Agent, or Firm—Pillsbury Winthrop LLP

(57) ABSTRACT

A compact image pickup optical system satisfactorily corrected for chromatic aberration as well as decentration aberrations and capable of providing a clear image with minimal distortion even at a wide field angle. The image pickup optical system includes an image pickup optical element and a diffractive optical element, which are decentered with respect to each other. The image pickup optical element has at least three optical surfaces adjacent to each other. At least one of the three optical surfaces is formed from a curved surface. At least two reflections take place between the optical surfaces.

11 Claims, 7 Drawing Sheets

IMAGE PICKUP OPTICAL SYSTEM

This application claims benefit of Japanese Application No. Hei 11-281032 filed in Japan on Oct. 1, 1999, the contents of which are incorporated by this reference.

BACKGROUND OF THE INVENTION

The present invention relates to an image pickup optical system and, more particularly, to an image pickup optical system including a reflective decentered image pickup optical element and a diffractive optical element.

Japanese Patent Application Unexamined Publication (KOKAI) No. Hei 10-333040 is known as a conventional compact reflective decentered image pickup optical system capable of two-dimensional imaging. The known optical system has at least a rear optical unit on the image side of a pupil plane. When a light ray emanating from the center of an object and passing through the pupil center to reach the image center is defined as an axial principal ray, the rear optical unit has an optical system with at least three surfaces each decentered so that the whole surface is tilted with respect to the principal ray. The surfaces include a rotationally symmetric curved surface that has both reflecting and transmitting actions and a rotationally asymmetric curved surface that has a reflecting action and corrects rotationally asymmetric decentration aberrations caused by decentration.

Chromatic aberration produced in the conventional reflective decentered image pickup optical system cannot satisfactorily be corrected by the optical system alone. Consequently, the chromatic aberration causes the captured image to be degraded in image quality.

Conventionally, a coaxial optical system is corrected for chromatic aberration by combining a negative lens with a positive lens. With respect to a refractive positive lens, a negative lens can correct both chromatic aberration and curvature of field. With respect to a reflective positive lens, however, a negative lens tends to cause curvature of field to become unfavorably large, although it can correct chromatic aberration. The reason for this is that a reflective positive lens has positive curvature of field, whereas a refractive positive lens has negative curvature of field.

Meanwhile, a conventional reflective decentered ocular optical system has a relatively long focal length. Therefore, if an image is formed on a small-sized image pickup device, the image taking range becomes unfavorably narrow.

SUMMARY OF THE INVENTION

In view of the above-described problems with the prior art, an object of the present invention is to provide a compact image pickup optical system satisfactorily corrected for chromatic aberration as well as decentration aberrations and capable of providing a clear image with minimal distortion even at a wide field angle.

To attain the above-described object, the present invention provides an image pickup optical system including an image pickup optical element and a diffractive optical element, which are decentered with respect to each other. The image pickup optical element has at least three optical surfaces adjacent to each other. At least one of the three optical surfaces is formed from a curved surface. At least two reflections take place between the optical surfaces.

The reasons for adopting the above-described arrangement in the present invention, together with the function thereof, will be described below.

The image pickup optical system according to the present invention is characterized by including a reflective decentered image pickup optical element and a diffractive optical element placed on the object or image side of the image pickup optical element.

A diffractive optical element has very strong negative dispersion (Abbe's number: −3.45) and is therefore capable of correcting chromatic aberration produced by a positive lens. Moreover, because the Petzval sum is zero, the diffractive optical element has no effect on curvature of field. Therefore, only chromatic aberration can be further corrected without increasing curvature of field by combining a diffractive optical element with the reflective decentered image pickup optical element, which is a reflective positive lens.

Accordingly, by incorporating a diffractive optical element into a reflective decentered image pickup optical system with a wide image taking range, it is possible to correct chromatic aberration without increasing curvature of field and to provide a clear image with minimal distortion even at a wide field angle.

It is preferable to satisfy the following condition:

$$-1 < F < 1 \tag{1}$$

wherein F is the value of (the focal length of the image pickup optical system) divided by (the focal length of the diffractive optical element).

It should be noted that the focal length of a decentered optical system is defined as follows. As shown in FIG. 9, when the direction of decentration of the optical system is taken in the Y-axis direction, a light ray which is parallel to an axial principal ray 2 and which has a small height d in the YZ-plane is made to enter the optical system from the object side thereof. The sine of the angle that is formed between the two rays exiting from the optical system in the YZ-plane is denoted by NA'yi, and NA'yi/d is defined as the power Py in the Y-axis direction of the entire optical system. Similarly, a light ray which is parallel to the axial principal ray 2 and which has a small height d in the XZ-plane is made to enter the optical system from the object side thereof. The sine of the angle that is formed between the two rays exiting from the optical system in a plane perpendicularly intersecting the YZ-plane and containing the exiting axial principal ray is denoted by NA'xi, and NA'xi/d is defined as the power Px in the X-axis direction of the entire optical system. Furthermore, the reciprocals of the powers Px and Py are defined as the focal lengths Fx and Fy in the X- and Y-axis directions, respectively, of the entire optical system. In the present invention, the term (the focal length of the image pickup optical system) includes both the focal lengths Fx and Fy. In Examples (described later), however, the term (the focal length of the image pickup optical system) means the focal length Fy.

The condition (1) determines the aberration correction balance between the entire optical system and the diffractive optical element. If F is not smaller than the upper limit of the condition (1), i.e. 1, the amount of aberration corrected by the diffractive optical element becomes excessive. If F is not larger than the lower limit, i.e. −1, the amount of aberration corrected by the diffractive optical element becomes deficient. In either case, the balance of aberration corrected by the diffractive optical element with respect to chromatic aberration produced in the optical system is destroyed, and it becomes impossible to attain favorable aberration correction.

It is even more desirable to satisfy the following condition:

$$-0.1 < F < 0.1 \quad (1\text{-}1)$$

It is still more desirable to satisfy the following condition:

$$0 < F < 0.1 \quad (1\text{-}2)$$

It is practically preferable that the image pickup optical element in the image pickup optical system according to the present invention should be formed from a prism member in which the space defined by the at least three surfaces is filled with a :transparent medium having a refractive index larger than 1.

Preferably, at least one curved surface of the image pickup optical element is a rotationally asymmetric surface with no axis of rotational symmetry in the surface nor out of the surface. The rotationally asymmetric surface has a totally reflecting action or a reflecting action. When a light ray emanating from the center of an object and passing through the pupil center to reach the image center is defined as an axial principal ray, the rotationally asymmetric surface is tilted with respect to the axial principal ray. The rotationally asymmetric surface corrects rotationally asymmetric aberrations due to decentration by the rotationally asymmetric surface configuration. The diffractive optical element is placed on the object or image side of the image pickup optical element. With the above-described arrangement, it is possible to attain an image pickup optical system favorably corrected for both decentration aberrations and chromatic aberrations.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = cr^2 / \left[1 + \sqrt{\{1-(1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:

c: the curvature at the vertex k: a conic constant r=$\sqrt{(X^2+Y^2)}$

The free-form surface term is given by $$\sum_{j=2}^{66} C_j X^m Y^n = C_2 X + C_3 Y + C_4 X^2 + C_5 XY + C_6 Y^2 + C_7 X^3 +$$

$$C_8 X^2 Y + C_9 XY^2 + C_{10} Y^3 + C_{11} X^4 + C_{12} X^3 Y + C_{13} X^2 Y^2 +$$

$$C_{14} XY^3 + C_{15} Y^4 + C_{16} X^5 + C_{17} X^4 Y + C_{18} X^3 Y^2 + C_{19} X^2 Y^3 +$$

$$C_{20} XY^4 + C_{21} Y^5 + C_{22} X^6 + C_{23} X^5 Y + C_{24} X^4 Y^2 + C_{25} X^3 Y^3 +$$

$$C_{26} X^2 Y^4 + C_{27} XY^5 + C_{28} Y^6 + C_{29} X^7 + C_{30} X^6 Y + C_{31} X^5 Y^2 +$$

$$C_{32} X^4 Y^3 + C_{33} X^3 Y^4 + C_{34} X^2 Y^5 + C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes.

In the present invention, however, a free-form surface having only one plane of symmetry parallel to the YZ-plane is obtained by making all terms of odd-numbered degrees with respect to X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (a), the coefficients of the terms $C_3$, $C_5$, $C_8$, $C_{10}$, $C_{12}$, $C_{14} C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the: optical system is determined to be the X-axis direction. By doing so, rotationally asymmetric aberrations caused by decentration can be corrected effectively, and at the same time, productivity can be improved.

It should be noted that the above defining equation (a) is shown as merely an example as stated above, and that the feature of the present invention resides in that rotationally asymmetric aberrations caused by decentration are corrected and, at the same time, productivity is improved by using a rotationally asymmetric surface having only one plane of symmetry. Therefore, the same advantageous effect can be obtained for any other defining equation that expresses such a rotationally asymmetric surface.

Incidentally, the above-described prism member may be arranged as follows. The prism member has three optical surfaces: a first surface having a transmitting action; a second surface having both reflecting and transmitting actions; and a third surface having a reflecting action. Light from an object enters the prism member through the first surface. The light is reflected by the second surface and further reflected by the third surface and exits from the prism member through the second surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims. dr

DESCRIPTION OF THE PREFERRED EMBODIMENTS

Examples 1 to 5 of the image pickup optical system according to the present invention will be described below. It should be noted that constituent parameters of each example will be shown later.

Figure 1:
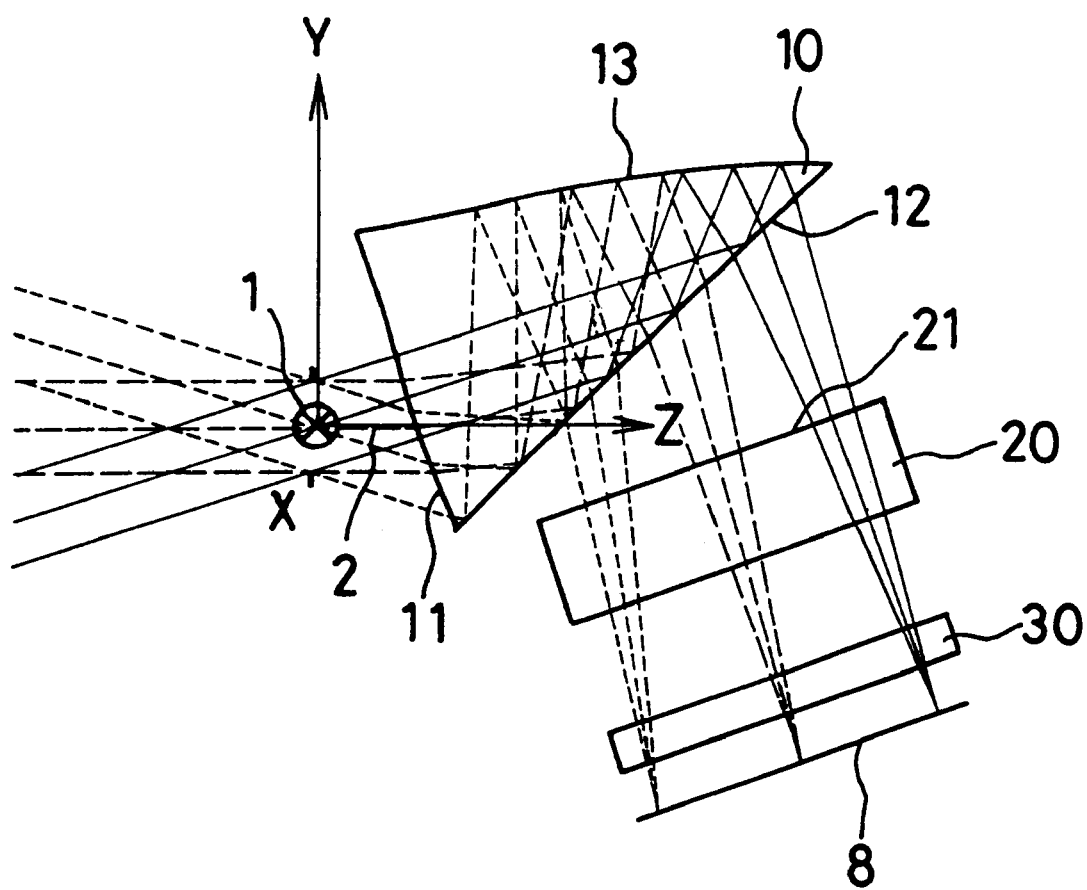
FIG. 1 is a sectional view of an image pickup optical system according to Example 1 of the present invention taken in the direction of decentration.
Figure 2:
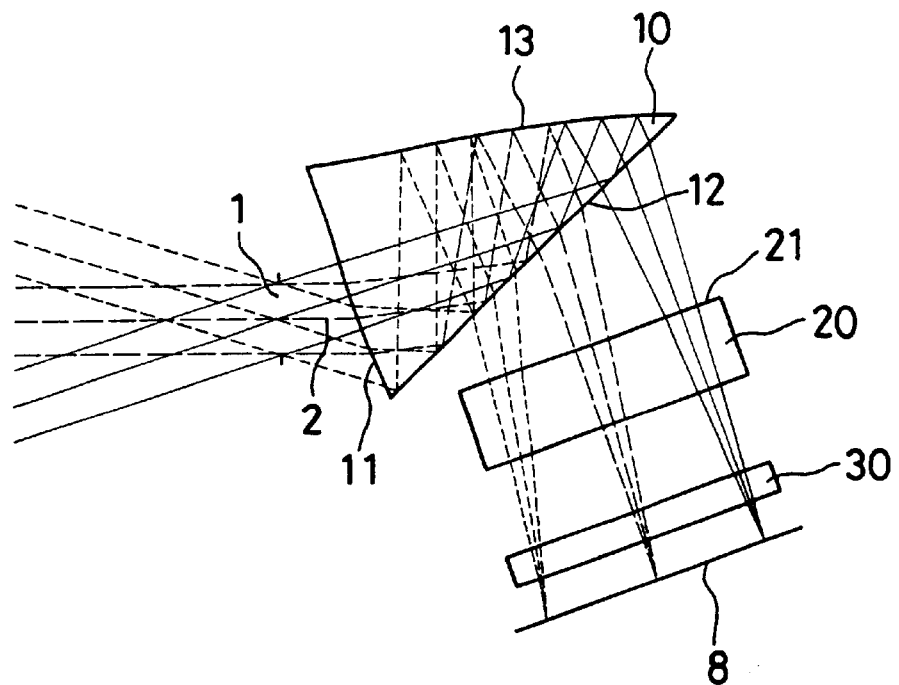
FIG. 2 is a sectional view of an image pickup optical system according to Example 2 of the present invention taken in the direction of decentration.
Figure 3:
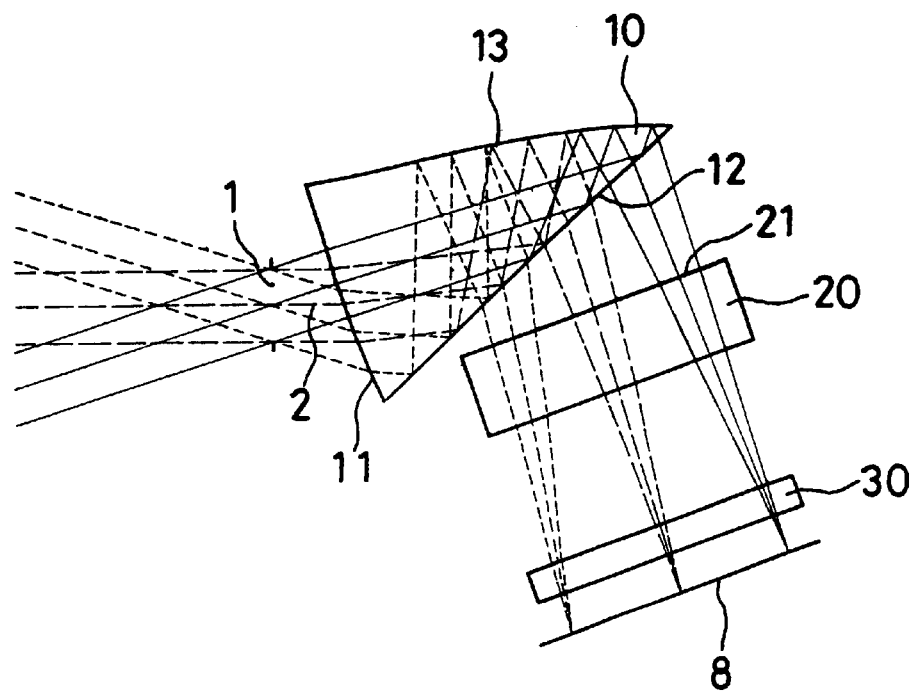
FIG. 3 is a sectional view of an image pickup optical system according to Example 3 of the present invention taken in the direction of decentration.
Figure 4:
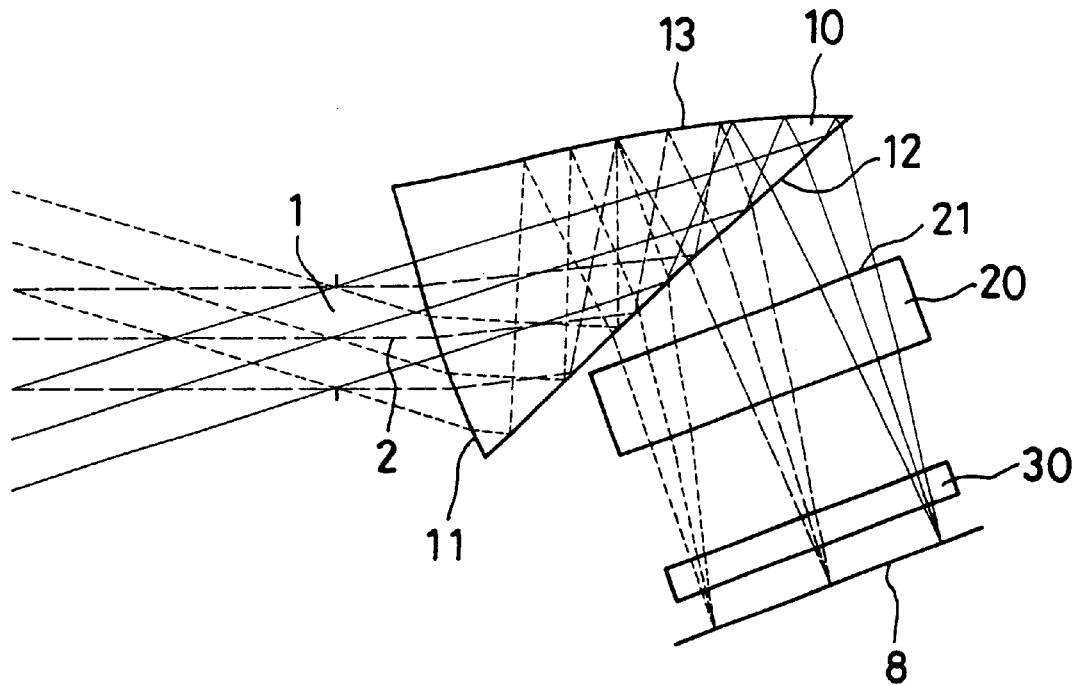
FIG. 4 is a sectional view of an image pickup optical system according to Example 4 of the present invention taken in the direction of decentration.

In each example, as shown in FIG. 1, the center of a stop plane of surface No. 1 in the optical system is defined as the origin of a decentered optical system, and an axial principal ray 2 is defined by a ray emanating from the center of an object and passing through the center of the stop 1. A Z-axis is taken in the direction in which the axial principal ray 2 travels from the object center to the first surface, of the optical system. A plane containing the Z-axis and the center of the image plane is defined as a YZ-plane. A Y-axis is taken in a direction in a plane in which rays are folded by the surfaces of the optical system, perpendicularly intersecting the Z-axis in the YZ-plane. The direction in which the Z-axis extends from the object point toward the first surface of the optical system is defined as a positive direction of the Z-axis. The upward direction as viewed in the figures is defined as a positive direction of the Y-axis. An axis that constitutes a right-handed orthogonal coordinate system in combination with the Y- and Z-axes is defined as an X-axis.

In Examples 1 to 5, decentration of each surface is made in the YZ-plane, and one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical functional surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of a free-form surface used in the resent invention is defined by the above equation (a). The Z-axis of the defining equation is the axis of the free-form surface.

Aspherical surfaces are rotationally symmetric aspherical surfaces given by the following equation:

$$Z = (y^2/R) / \left[ 1 + \{1 - (1+K)y^2/R^2\}^{1/2} \right] + Ay^4 + By^6 + Cy^8 + Dy^{10} + \ldots \quad (b)$$

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), A is the distance from the Z-axis in the XY-plane, and R is the azimuth angle about the Z-axis, which is expressed by the angle of rotation measured from the Z-axis.

$x = R \times \cos(A)$ $y = R \times \sin(A)$ $Z = D_2$ $+ D_3 R \cos(A) + D_4 R \sin(A)$ $+ D_5 R^2 \cos(2A) + D_6(R^2-1) + D_7 R^2 \sin(2A)$ $+ D_8 R^3 \cos(3A) + D_9(3R^3-2R)\cos(A) + D_{10}(3R^3-2R)\sin(A) + D_{11}R^3 \sin(3A)$ $+ D_{12}R^4 \cos(4A) + D_{13}(4R^4-3R^2)\cos(2A) + D_{14}(6R^4-6R^2+1) + D_{15}(4R^4-3R^2)\sin(2A) + D_{16}R^4 \sin(4A)$ $+ D_{17}R^5 \cos(5A) + D_{18}(5R^5-4R^3)\cos(3A) + D_{19}(10R^5-12R^3+3R)\cos(A) + D_{20}(10R^5-12R^3+3R)\sin(A) + D_{21}(5R^5-4R^3)\sin(3A) + D_{22}R^5 \sin(5A)$ $+ D_{23}R^6 \cos(6A) + D_{24}(6R^6-5R^4)\cos(4A) + D_{25}(15R^6-20R^4+6R^2)\cos(2A) +$ $D_{26}(20R^{-6}30R^4+12R^2-1) + D_{27}(15R^6-20R^4+6R^2)\sin(2A) + D_{28}(6R^6-5R^4)\sin(4A) + D_{29}R^6 \sin(6A)$ (c)

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation (d):

$Z = \Sigma\Sigma C_{nm} XY$

Assuming that k=7 (polynomial of degree 7), for example, a free-form surface is expressed by an expanded form of the above equation as follows:

$Z = C_2$ $C_3 Y + C_4 |X|$ $+ C_5 Y^2 + C_6 Y|X| + C_7 X^2$ $+ C_8 Y^3 + C_9 Y^2 |X| + C_{10} YX^2 + C_{11} |X^3|$ $+ C_{12} Y^4 + C_{13} Y^3 |X| + C_{14} Y^2 X^2 + C_{15} Y|X^3| + C_{16} X^4$ $+ C_{17} Y^5 + C_{18} Y^4 |X| + C_{19} Y^3 X^2 + C_{20} Y^2 |X^3| + C_{21} YX^4 + C_{22} |X^5|$ $+ C_{23} Y^6 + C_{24} Y^5 |X| + C_{25} Y^4 X^2 + C_{26} Y^3 |X^3| + C_{27} Y^2 X^4 + C_{28} Y|X^5| + C_{29} X^6$ $+C_{30}Y^7+C_{31}Y^6|X|+C_{32}Y^5X^2+C_{33}Y^4|X^3|+C_{34}Y^3X^4+C_{35}Y^2|X^5|+C_{36}YX^6+C_{37}|X^7|$          (d)

Although in the examples of the present invention the surface configuration is expressed by a free-form surface using the above equation (a), it should be noted that the same advantageous effect can be obtained by using the above equation (c) or (d).

It should be noted that diffractive optical elements are described, for example, in Chapters VI and VII of "Small-Sized Optical Elements for Optical System Designers" (Optronics) and "SPIE", Vol. 126, p.46–53 (1977). It is possible to obtain a diffractive optical element in which the Abbe's number ν in the visible region is −3.453 and the partial dispersion ratio $\theta_{g,F}$ is 0.03. In addition, the diffraction grating interval can be changed freely. Therefore, the diffractive optical element can be treated as equivalent to any aspherical lens surface. In the following, "ultra-high index method" described in "SPIE", Vol. 126, p.46–53 (1977) is used.

FIGS. 1 to 5 are sectional views of image pickup optical systems according to Examples 1 to 5 taken in the direction of decentration. In each example, the horizontal field angle is 43.78°, and the vertical field angle is 33.16°. In Examples 1 to 3 and 5, the entrance pupil diameter is 1.25 millimeters. In Example 4, the entrance pupil diameter is 1.75 millimeters.

As shown in FIGS. 1 to 4, Examples 1 to 4 each have, in order in which light passes from the object side in forward ray tracing, a stop 1, a decentered prism 10, a diffractive optical element 20, a plane-parallel plate 30, and an image plane 8. The decentered prism 10 has, in order in which light rays pass, a first surface 11 as an entrance refracting surface, a second surface 12 serving as both a totally reflecting surface and an exit refracting surface, and a third surface 13 as an internally reflecting surface. The diffractive optical element 20 has a diffraction surface 21 on the entrance side thereof.

Figure 5:
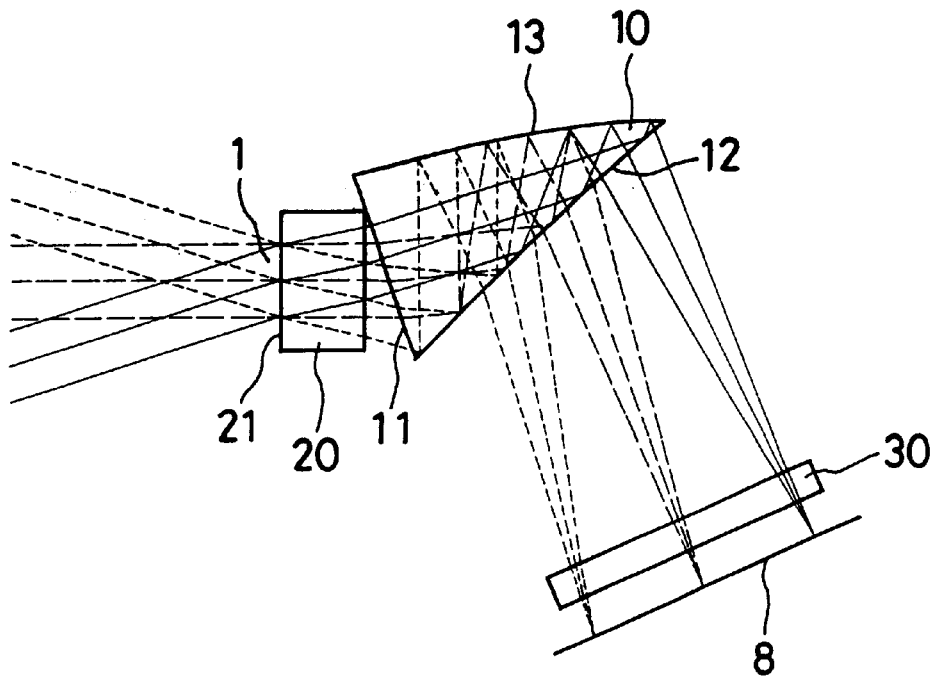
FIG. 5 is a sectional view of an image pickup optical system according to Example 5 of the present invention taken in the direction of decentration.

As shown in FIG. 5, Example 5 has, in order in which light passes from the object side in forward ray tracing, a stop 1, a diffractive optical element 20, a decentered prism 10, a plane-parallel plate 30, and an image plane 8. The decentered prism 10 has, in order in which light rays pass, a first surface 11 as an entrance refracting surface, a second surface 12 serving as both a totally reflecting surface and an exit refracting surface, and a third surface 13 as an internally reflecting surface. The diffractive optical element 20 has a diffraction surface 21 on the entrance side thereof.

Constituent parameters of each of the foregoing examples are shown below. In the tables below: "IFFS" denotes a free-form surface; "ASS" denotes an aspherical surface; and "DOE" denotes a diffraction surface.

EXAMPLE 1

| Surface No. | Radius of curvature | Surface separation | Displacement and tilt | Refractive index | Abbe's No. |
|---|---|---|---|---|---|
| Object plane | ∞ | 120.00 | | | |
| 1 | ∞ (Stop) | | (1) | | |
| 2 | FFS① | | (2) | 1.5254 | 55.8 |
| 3 | FFS② | | (3) | 1.5254 | 55.8 |
| 4 | FFS③ | | (4) | 1.5254 | 55.8 |
| 5 | FFS② | | (3) | | |
| 6 | ASS① (DOE) | | (5) | 1001.0681 | −3.5 |
| 7 | ∞ | | (5) | 1.5254 | 55.8 |
| 8 | ∞ | | (6) | | |
| 9 | ∞ | | (7) | 1.5163 | 64.1 |
| 10 | ∞ | | (8) | | |
| Image plane | ∞ | | (9) | | |

ASS①

R    168504.50
K    −1.0000
A    $2.8577 \times 10^{-7}$
B    $-2.0404 \times 10^{-8}$

FFS①

$C_4$   $3.2301 \times 10^{-2}$   $C_6$   $3.2206 \times 10^{-2}$   $C_8$   $-3.3921 \times 10^{-3}$
$C_{10}$   $-2.7260 \times 10^{-3}$   $C_{11}$   $7.3457 \times 10^{-4}$   $C_{13}$   $-2.7483 \times 10^{-4}$
$C_{15}$   $-1.5716 \times 10^{-3}$   $C_{17}$   $3.9878 \times 10^{-5}$   $C_{19}$   $1.2794 \times 10^{-5}$
$C_{21}$   $6.1993 \times 10^{-6}$

FFS②

$C_4$   $3.7647 \times 10^{-3}$   $C_6$   $2.4601 \times 10^{-3}$   $C_8$   $6.3843 \times 10^{-4}$
$C_{10}$   $7.7978 \times 10^{-4}$   $C_{11}$   $-3.0687 \times 10^{-4}$   $C_{13}$   $-3.3674 \times 10^{-4}$
$C_{15}$   $-1.2374 \times 10^{-4}$   $C_{17}$   $3.9878 \times 10^{-5}$   $C_{19}$   $1.2794 \times 10^{-5}$
$C_{21}$   $6.1993 \times 10^{-6}$

FFS③

$C_4$   $2.2145 \times 10^{-2}$   $C_6$   $2.0516 \times 10^{-2}$   $C_8$   $9.1268 \times 10^{-4}$
$C_{10}$   $1.7447 \times 10^{-3}$   $C_{11}$   $-2.0845 \times 10^{-4}$   $C_{13}$   $-4.6441 \times 10^{-4}$
$C_{15}$   $-1.9364 \times 10^{-4}$   $C_{17}$   $3.9878 \times 10^{-5}$   $C_{19}$   $1.2794 \times 10^{-5}$
$C_{21}$   $6.1993 \times 10^{-6}$ Displacement and tilt(1)

X   0.00   Y   0.00   Z   0.00
α   0.00   β   0.00   γ   0.00

Displacement and tilt(2)

X   0.00   Y   0.00   Z   1.52
α   21.15   β   0.00   γ   0.00

Displacement and tilt(3)

X   0.00   Y   0.03   Z   3.51
α   −45.65   β   0.00   γ   0.00

Displacement and tilt(4)

X   0.00   Y   3.37   Z   4.27
α   −81.50   β   0.00   γ   0.00

Displacement and tilt(5)

X   0.00   Y   −0.41   Z   5.72
α   −71.15   β   0.00   γ   0.00

Displacement and tilt(6)

X   0.00   Y   −1.85   Z   6.15
α   −71.15   β   0.00   γ   0.00

Displacement and tilt(7)

X   0.00   Y   −3.37   Z   6.59
α   −71.15   β   0.00   γ   0.00

Displacement and tilt(8)

X   0.00   Y   −3.90   Z   6.75
α   −71.15   β   0.00   γ   0.00

Displacement and tilt(9)

X   0.00   Y   −4.57   Z   6.94
α   −71.15   β   0.00   γ   0.00

EXAMPLE 2

| Surface No. | Radius of curvature | Surface separation | Displacement and tilt | Refractive index | Abbe's No. |
|---|---|---|---|---|---|
| Object plane | ∞ | 100.00 | | | |
| 1 | ∞ (Stop) | | (1) | | |
| 2 | FFS① | | (2) | 1.5254 | 55.8 |
| 3 | FFS② | | (3) | 1.5254 | 55.8 |
| 4 | FFS③ | | (4) | 1.5254 | 55.8 |
| 5 | FFS② | | (3) | | |
| 6 | ASS① (DOE) | | (5) | 1001.0681 | −3.5 |
| 7 | ∞ | | (5) | 1.5254 | 55.8 |
| 8 | ∞ | | (6) | | |
| 9 | ∞ | | (7) | 1.5163 | 64.1 |
| 10 | ∞ | | (8) | | |
| Image plane | ∞ | | (9) | | |

ASS①

R    167947.12
k    −1.0000
A    $2.8355 \times 10^{-7}$
B    $-2.0524 \times 10^{-8}$

FFS①

$C_4$  $3.2473 \times 10^{-2}$   $C_6$  $3.2306 \times 10^{-2}$   $C_8$  $-3.3937 \times 10^{-3}$
$C_{10}$ $-2.7291 \times 10^{-3}$  $C_{11}$ $7.6406 \times 10^{-4}$  $C_{13}$ $-2.6269 \times 10^{-4}$
$C_{15}$ $-1.5664 \times 10^{-3}$  $C_{17}$ $4.0687 \times 10^{-5}$  $C_{19}$ $1.2674 \times 10^{-5}$
$C_{21}$ $6.1858 \times 10^{-6}$

FFS②

$C_4$  $3.7240 \times 10^{-3}$   $C_6$  $2.4489 \times 10^{-3}$   $C_8$  $6.3565 \times 10^{-4}$
$C_{10}$ $7.7892 \times 10^{-4}$  $C_{11}$ $-3.0851 \times 10^{-4}$ $C_{13}$ $-3.3678 \times 10^{-4}$
$C_{15}$ $-1.2385 \times 10^{-4}$ $C_{17}$ $4.0687 \times 10^{-5}$ $C_{19}$ $1.2674 \times 10^{-}$
$C_{21}$ $6.1858 \times 10^{-6}$

FFS③

$C_4$  $2.2177 \times 10^{-2}$   $C_6$  $2.0535 \times 10^{-2}$   $C_8$  $9.1218 \times 10^{-4}$
$C_{10}$ $1.7442 \times 10^{-3}$  $C_{11}$ $-2.0776 \times 10^{-4}$ $C_{13}$ $-4.6357 \times 10^{-4}$
$C_{15}$ $-1.9379 \times 10^{-4}$ $C_{17}$ $4.0687 \times 10^{-5}$ $C_{19}$ $1.2674 \times 10^{-5}$
$C_{21}$ $6.1858 \times 10^{-6}$ Displacement and tilt(1)

X  0.00   Y  0.00   Z  0.00
α  0.00   β  0.00   γ  0.00

Displacement and tilt(2)

X  0.00   Y  0.00   Z  1.51
α  21.22  β  0.00   γ  0.00

Displacement and tilt(3)

X  0.00   Y  0.03   Z  3.51
α  −45.61 β  0.00   γ  0.00

Displacement and tilt(4)

X  0.00   Y  3.38   Z  4.27
α  −81.54 β  0.00   γ  0.00

Displacement and tilt(5)

X  0.00   Y  −0.43  Z  5.72
α  −71.37 β  0.00   γ  0.00

Displacement and tilt(6)

X  0.00   Y  −1.87  Z  6.13
α  −71.37 β  0.00   γ  0.00

Displacement and tilt(7)

X  0.00   Y  −3.41  Z  6.58
α  −71.37 β  0.00   γ  0.00

Displacement and tilt(8)

X  0.00   Y  −3.94  Z  6.73
α  −71.37 β  0.00   γ  0.00

-continued

Displacement and tilt(9)

X  0.00   Y  −4.61  Z  6.92
α  −71.37 β  0.00   γ  0.00

EXAMPLE 3

| Surface No. | Radius of curvature | Surface separation | Displacement and tilt | Refractive index | Abbe's No. |
|---|---|---|---|---|---|
| Object plane | ∞ | 100.00 | | | |
| 1 | ∞ (Stop) | | (1) | | |
| 2 | FFS① | | (2) | 1.5254 | 55.8 |
| 3 | FFS② | | (3) | 1.5254 | 55.8 |
| 4 | FFS③ | | (4) | 1.5254 | 55.8 |
| 5 | FFS② | | (3) | | |
| 6 | ASS① (DOE) | | (5) | 1001.0681 | −3.5 |
| 7 | ∞ | | (5) | 1.5254 | 55.8 |
| 8 | ∞ | | (6) | | |
| 9 | ∞ | | (7) | 1.5163 | 64.1 |
| 10 | ∞ | | (8) | | |
| Image plane | ∞ | | (9) | | |

ASS①

R    189993.46
K    −1.0000
A    $1.5437 \times 10^{-7}$
B    $-1.3824 \times 10^{-8}$

FFS①

$C_4$  $2.6894 \times 10^{-2}$   $C_6$  $3.0340 \times 10^{-2}$   $C_8$  $-2.7339 \times 10^{-3}$
$C_{10}$ $-3.9117 \times 10^{-3}$ $C_{11}$ $1.1504 \times 10^{-3}$ $C_{13}$ $2.3711 \times 10^{-4}$
$C_{15}$ $-1.7602 \times 10^{-3}$ $C_{17}$ $3.8565 \times 10^{-5}$ $C_{19}$ $2.2049 \times 10^{-}$
$C_{21}$ $7.4841 \times 10^{-6}$

FFS②

$C_4$  $4.8731 \times 10^{-3}$   $C_6$  $3.2135 \times 10^{-3}$   $C_8$  $8.3515 \times 10^{-4}$
$C_{10}$ $9.4504 \times 10^{-4}$  $C_{11}$ $-2.6553 \times 10^{-4}$ $C_{13}$ $-3.6616 \times 10^{-4}$
$C_{15}$ $-1.5373 \times 10^{-4}$ $C_{17}$ $3.8565 \times 10^{-5}$ $C_{19}$ $2.2049 \times 10^{-5}$
$C_{21}$ $7.4841 \times 10^{-6}$

FFS③

$C_4$  $2.4041 \times 10^{-2}$   $C_6$  $2.3470 \times 10^{-2}$   $C_8$  $7.9647 \times 10^{-4}$
$C_{10}$ $1.7022 \times 10^{-3}$  $C_{11}$ $-1.8199 \times 10^{-4}$ $C_{13}$ $-4.2777 \times 10^{-4}$
$C_{15}$ $-2.1400 \times 10^{-4}$ $C_{17}$ $3.8565 \times 10^{-5}$ $C_{19}$ $2.2049 \times 10^{-5}$
$C_{21}$ $7.4841 \times 10^{-6}$ Displacement and tilt(1)

X  0.00   Y  0.00   Z  0.00
α  0.00   β  0.00   γ  0.00

Displacement and tilt(2)

X  0.00   Y  0.00   Z  1.34
α  20.76  β  0.00   γ  0.00

Displacement and tilt(3)

X  0.00   Y  −0.15  Z  3.66
α  −45.70 β  0.00   γ  0.00

Displacement and tilt(4)

X  0.00   Y  2.94   Z  4.62
α  −81.19 β  0.00   γ  0.00

-continued

| Surface No. | Radius of curvature | Surface separation | Displacement and tilt | Refractive index | Abbe's No. |
|---|---|---|---|---|---|

Displacement and tilt(5)

| X | 0.00 | Y | 0.00 | Z | 5.86 |
|---|---|---|---|---|---|
| $\alpha$ | −69.74 | $\beta$ | 0.00 | $\gamma$ | 0.00 |

Displacement and tilt(6)

| X | 0.00 | Y | −1.43 | Z | 6.33 |
|---|---|---|---|---|---|
| $\alpha$ | −69.74 | $\beta$ | 0.00 | $\gamma$ | 0.00 |

Displacement and tilt(7)

| X | 0.00 | Y | −3.82 | Z | 7.12 |
|---|---|---|---|---|---|
| $\alpha$ | −69.74 | $\beta$ | 0.00 | $\gamma$ | 0.00 |

Displacement and tilt(8)

| X | 0.00 | Y | −4.35 | Z | 7.29 |
|---|---|---|---|---|---|
| $\alpha$ | −69.74 | $\beta$ | 0.00 | $\gamma$ | 0.00 |

Displacement and tilt(9)

| X | 0.00 | Y | −5.01 | Z | 7.51 |
|---|---|---|---|---|---|
| $\alpha$ | −69.74 | $\beta$ | 0.00 | $\gamma$ | 0.00 |

EXAMPLE 4

| Surface No. | Radius of curvature | Surface separation | Displacement and tilt | Refractive index | Abbe's No. |
|---|---|---|---|---|---|
| Object plane | ∞ | 120.00 | | | |
| 1 | ∞ (Stop) | | (1) | | |
| 2 | FFS① | | (2) | 1.5254 | 55.8 |
| 3 | FFS② | | (3) | 1.5254 | 55.8 |
| 4 | FFS③ | | (4) | 1.5254 | 55.8 |
| 5 | FFS② | | (3) | | |
| 6 | ASS① (DOE) | | (5) | 1001.0681 | −3.5 |
| 7 | ∞ | | (5) | 1.5254 | 55.8 |
| 8 | ∞ | | (6) | | |
| 9 | ∞ | | (7) | 1.5168 | 64.1 |
| 10 | ∞ | | (8) | | |
| Image plane | ∞ | | (9) | | |

ASS①

| R | 152047.24 |
|---|---|
| K | −1.0000 |
| A | $1.6279 \times 10^{-7}$ |
| B | $-1.2207 \times 10^{-8}$ |

FFS①

| $C_4$ | $3.2450 \times 10^{-2}$ | $C_6$ | $3.4473 \times 10^{-2}$ | $C_8$ | $-2.0879 \times 10^{-3}$ |
|---|---|---|---|---|---|
| $C_{10}$ | $-2.8230 \times 10^{-3}$ | $C_{11}$ | $2.8411 \times 10^{-4}$ | $C_{13}$ | $-2.4585 \times 10^{-4}$ |
| $C_{15}$ | $-1.2350 \times 10^{-3}$ | $C_{17}$ | $1.7504 \times 10^{-5}$ | $C_{19}$ | $1.0950 \times 10^{-5}$ |
| $C_{21}$ | $3.2640 \times 10^{-6}$ | | | | |

FFS②

| $C_4$ | $4.8562 \times 10^{-3}$ | $C_6$ | $1.9144 \times 10^{-3}$ | $C_8$ | $8.7540 \times 10^{-4}$ |
|---|---|---|---|---|---|
| $C_{10}$ | $8.3041 \times 10^{-4}$ | $C_{11}$ | $-2.2038 \times 10^{-3}$ | $C_{13}$ | $-2.4603 \times 10^{-4}$ |
| $C_{15}$ | $-9.5128 \times 10^{-5}$ | $C_{17}$ | $1.7504 \times 10^{-5}$ | $C_{19}$ | $1.0950 \times 10^{-5}$ |
| $C_{21}$ | $3.2640 \times 10^{-6}$ | | | | |

FFS③

| $C_4$ | $2.3554 \times 10^{-2}$ | $C_6$ | $2.2135 \times 10^{-2}$ | $C_8$ | $7.4724 \times 10^{-4}$ |
|---|---|---|---|---|---|
| $C_{10}$ | $1.3652 \times 10^{-3}$ | $C_{11}$ | $-1.2422 \times 10^{-4}$ | $C_{13}$ | $-2.7625 \times 10^{-4}$ |
| $C_{15}$ | $-1.3568 \times 10^{-4}$ | $C_{17}$ | $1.7504 \times 10^{-5}$ | $C_{19}$ | $1.0950 \times 10^{-5}$ |
| $C_{21}$ | $3.2640 \times 10^{-6}$ | | | | |

Displacement and tilt(1)

| X | 0.00 | Y | 0.00 | Z | 0.00 |
|---|---|---|---|---|---|
| $\alpha$ | 0.00 | $\beta$ | 0.00 | $\gamma$ | 0.00 |

Displacement and tilt(2)

| X | 0.00 | Y | 0.00 | Z | 1.82 |
|---|---|---|---|---|---|
| $\alpha$ | 19.94 | $\beta$ | 0.00 | $\gamma$ | 0.00 |

Displacement and tilt(3)

| X | 0.00 | Y | −0.43 | Z | 4.42 |
|---|---|---|---|---|---|
| $\alpha$ | −46.15 | $\beta$ | 0.00 | $\gamma$ | 0.00 |

Displacement and tilt(4)

| X | 0.00 | Y | 3.56 | Z | 5.88 |
|---|---|---|---|---|---|
| $\alpha$ | −81.80 | $\beta$ | 0.00 | $\gamma$ | 0.00 |

Displacement and tilt(5)

| X | 0.00 | Y | 0.39 | Z | 7.22 |
|---|---|---|---|---|---|
| $\alpha$ | −69.47 | $\beta$ | 0.00 | $\gamma$ | 0.00 |

Displacement and tilt(6)

| X | 0.00 | Y | −1.04 | Z | 7.69 |
|---|---|---|---|---|---|
| $\alpha$ | −69.47 | $\beta$ | 0.00 | $\gamma$ | 0.00 |

Displacement and tilt(7)

| X | 0.00 | Y | −3.05 | Z | 8.34 |
|---|---|---|---|---|---|
| $\alpha$ | −69.47 | $\beta$ | 0.00 | $\gamma$ | 0.00 |

Displacement and tilt(8)

| X | 0.00 | Y | −3.58 | Z | 8.51 |
|---|---|---|---|---|---|
| $\alpha$ | −69.47 | $\beta$ | 0.00 | $\gamma$ | 0.00 |

Displacement and tilt(9)

| X | 0.00 | Y | −4.24 | Z | 8.72 |
|---|---|---|---|---|---|
| $\alpha$ | −69.47 | $\beta$ | 0.00 | $\gamma$ | 0.00 |

EXAMPLE 5

| Surface No. | Radius of curvature | Surface separation | Displacement and tilt | Refractive index | Abbe's No. |
|---|---|---|---|---|---|
| Object plane | ∞ | 120.00 | | | |
| 1 | ∞ (Stop) | | (1) | | |
| 2 | ASS① (DOE) | | (1) | 1001.0681 | −3.5 |
| 3 | ∞ | | (1) | 1.5254 | 55.8 |
| 4 | ∞ | | (2) | | |
| 5 | FFS① | | (3) | 1.5254 | 55.8 |
| 6 | FFS② | | (4) | 1.5254 | 55.8 |
| 7 | FFS③ | | (5) | 1.5254 | 55.8 |
| 8 | FFS② | | (4) | | |
| 9 | ∞ | | (6) | 1.5163 | 64.1 |
| 10 | ∞ | | (7) | | |
| Image plane | ∞ | | (8) | | |

ASS①

| R | 187069.65 |
|---|---|
| K | −1.0000 |
| A | $-1.4405 \times 10^{-7}$ |
| B | $-4.6473 \times 10^{-7}$ |

FFS①

| $C_4$ | $4.1263 \times 10^{-3}$ | $C_6$ | $1.1031 \times 10^{-2}$ | $C_8$ | $-4.1889 \times 10^{-3}$ |
|---|---|---|---|---|---|
| $C_{10}$ | $-6.3731 \times 10^{-3}$ | $C_{11}$ | $1.5699 \times 10^{-3}$ | $C_{13}$ | $1.5682 \times 10^{-3}$ |

-continued

| Surface No. | Radius of curvature | Surface separation | Displacement and tilt | Refractive index | Abbe's No. |
|---|---|---|---|---|---|
| $C_{15}$ | $-9.7577 \times 10^{-4}$ | $C_{17}$ | $5.0556 \times 10^{-5}$ | $C_{19}$ | $3.8368 \times 10^{-5}$ |
| $C_{21}$ | $5.8074 \times 10^{-6}$ | | | | |
| | FFS② | | | | |
| $C_4$ | $8.9471 \times 10^{-3}$ | $C_6$ | $5.3532 \times 10^{-3}$ | $C_8$ | $-3.4269 \times 10^{-4}$ |
| $C_{10}$ | $5.0180 \times 10^{-4}$ | $C_{11}$ | $3.2151 \times 10^{-5}$ | $C_{13}$ | $-3.5719 \times 10^{-4}$ |
| $C_{15}$ | $-1.0965 \times 10^{-4}$ | $C_{17}$ | $5.0556 \times 10^{-5}$ | $C_{19}$ | $3.8368 \times 10^{-5}$ |
| $C_{21}$ | $5.8074 \times 10^{-6}$ | | | | |
| | FFS③ | | | | |
| $C_4$ | $2.8447 \times 10^{-2}$ | $C_6$ | $2.7227 \times 10^{-2}$ | $C_8$ | $-5.5674 \times 10^{-5}$ |
| $C_{10}$ | $1.1471 \times 10^{-3}$ | $C_{11}$ | $-2.2868 \times 10^{-5}$ | $C_{13}$ | $-3.9218 \times 10^{-4}$ |
| $C_{15}$ | $-1.2699 \times 10^{-4}$ | $C_{17}$ | $5.0556 \times 10^{-5}$ | $C_{19}$ | $3.8368 \times 10^{-5}$ |
| $C_{21}$ | $5.8074 \times 10^{-6}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 1.50 |
|---|---|---|---|---|---|
| α | 0.00 | β | 0.00 | γ | 0.00 |

Displacement and tilt(3)

| X | 0.00 | Y | 0.00 | Z | 1.93 |
|---|---|---|---|---|---|
| α | 19.77 | β | 0.00 | γ | 0.00 |

Displacement and tilt(4)

| X | 0.00 | Y | -0.35 | Z | 3.35 |
|---|---|---|---|---|---|
| α | -45.68 | β | 0.00 | γ | 0.00 |

Displacement and tilt(5)

| X | 0.00 | Y | 2.54 | Z | 4.36 |
|---|---|---|---|---|---|
| α | -80.35 | β | 0.00 | γ | 0.00 |

Displacement and tilt(6)

| X | 0.00 | Y | -4.04 | Z | 7.12 |
|---|---|---|---|---|---|
| α | -65.89 | β | 0.00 | γ | 0.00 |

Displacement and tilt(7)

| X | 0.00 | Y | -4.55 | Z | 7.32 |
|---|---|---|---|---|---|
| α | -65.89 | β | 0.00 | γ | 0.00 |

Displacement and tilt(8)

| X | 0.00 | Y | -5.20 | Z | 7.57 |
|---|---|---|---|---|---|
| α | -65.89 | β | 0.00 | γ | 0.00 |

Figure 6:
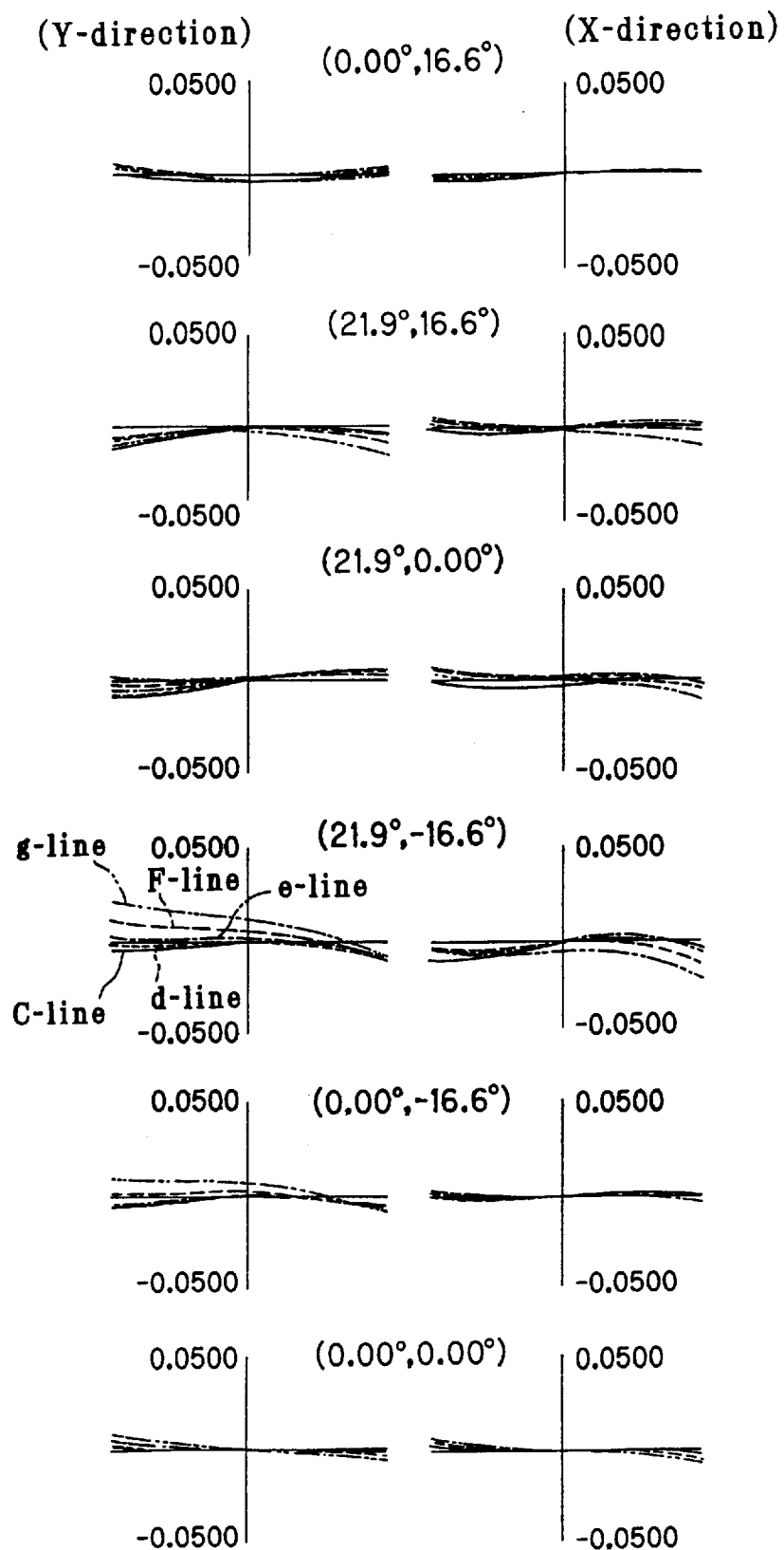
FIG. 6 is an aberrational diagram showing lateral aberrations in Example 1.
Figure 7:
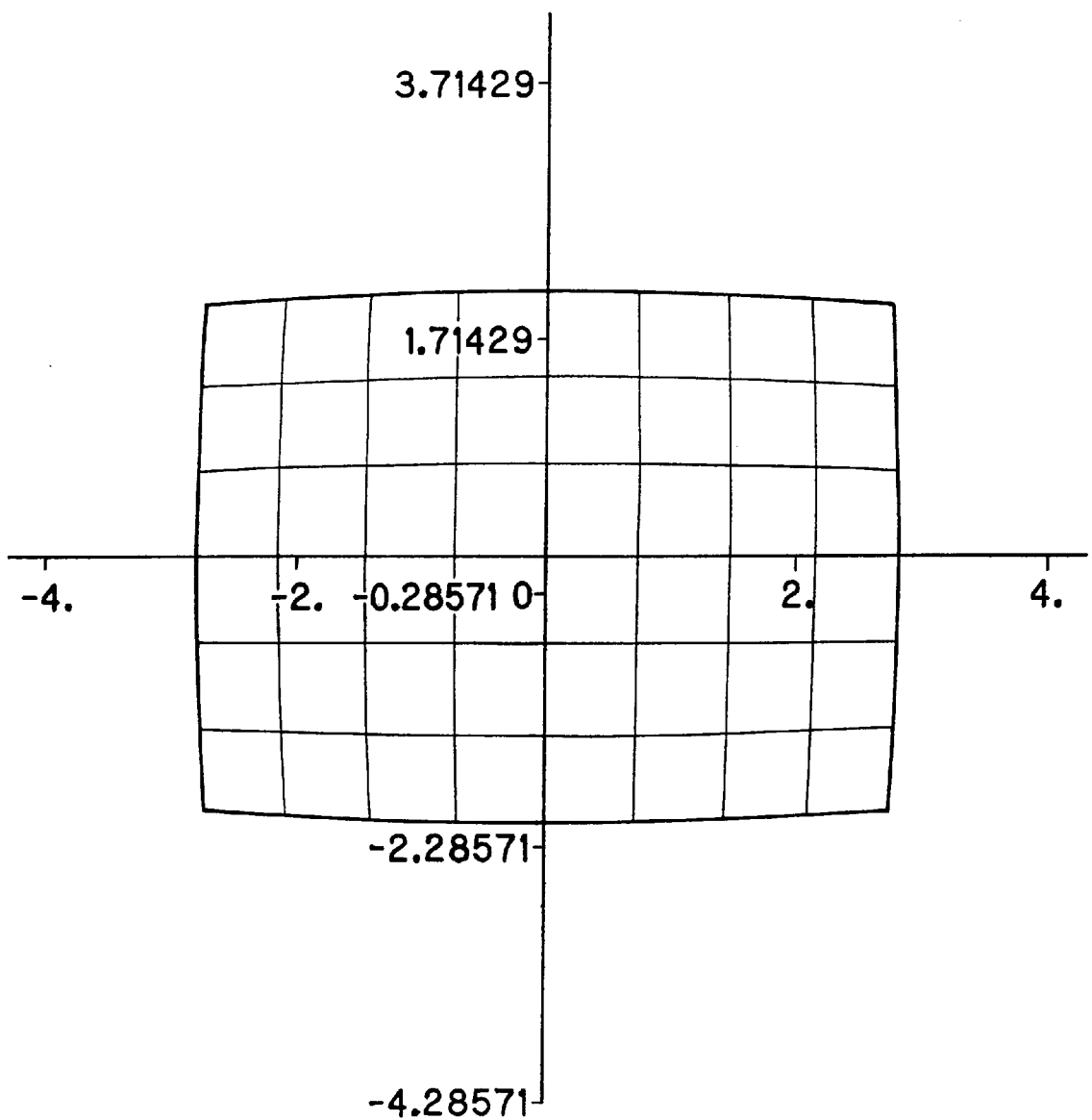
FIG. 7 an aberrational diagram showing distortion in Example 1.

FIG. 6 graphically shows lateral aberrations in the above-described Example 1 at each field angle, and FIG. 7 graphically shows the condition of distortion in Example 1. In FIG. 6, which shows lateral aberrations, the numerals in the parentheses denote (horizontal (X-direction) field angle, vertical (Y-direction) field angle), and lateral aberrations at the field angles are shown.

It should be noted that the focal length=$f_1$ of the entire optical system, the focal length=$f_2$ of the diffractive optical element 20 and the value of $f_1/f_2=F$ in Examples 1 to 5 are as follows.

| Example | $f_1$ | $f_2$ | F |
|---|---|---|---|
| 1 | 7.0671 | 168.504 | 0.04194 |
| 2 | 7.0374 | 167.947 | 0.04190 |
| 3 | 6.9881 | 27.188 | 0.03678 |
| 4 | 7.0922 | 152.047 | 0.04664 |
| 5 | 7.0012 | 187.07 | 0.03743 |

In the above-described arrangement, a power may be given to a substrate on which the diffraction surface 21 of the diffractive optical element 20 is provided.

Examples of the diffraction surface configuration of the diffractive optical element 20 include: an amplitude modulation type diffraction surface in which transparent and opaque portions are alternately arranged; a diffraction surface in which high and low refractive index portions are alternately arranged to provide a diffracting action by a phase difference produced by a difference in refractive index; a diffraction surface having a binary configuration with 2 levels, in which rectangular recesses and projections are alternately arranged to provide a diffracting action by a phase difference produced by a difference in thickness; a diffraction surface having a sawtooth surface, known as "kinoform", in which a diffracting action is provided by a continuous phase difference; and a diffraction surface with a binary configuration obtained by approximating a kinoform with a staircase-shaped configuration of 4 or more levels.

Figure 8:
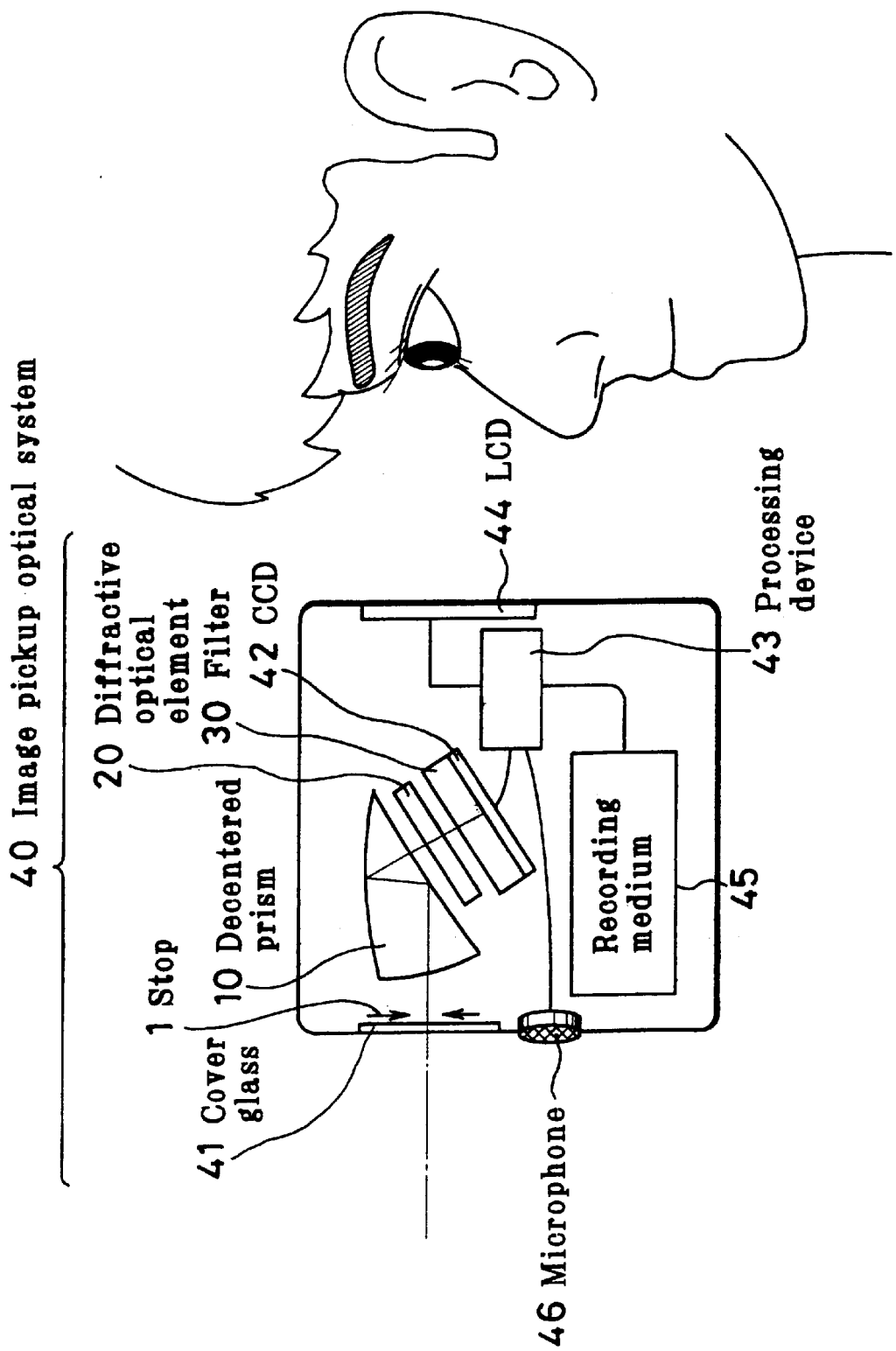
FIG. 8 is a conceptual view showing an arrangement in which an image pickup optical system according to the present invention is incorporated into an image pickup apparatus.
Figure 9:
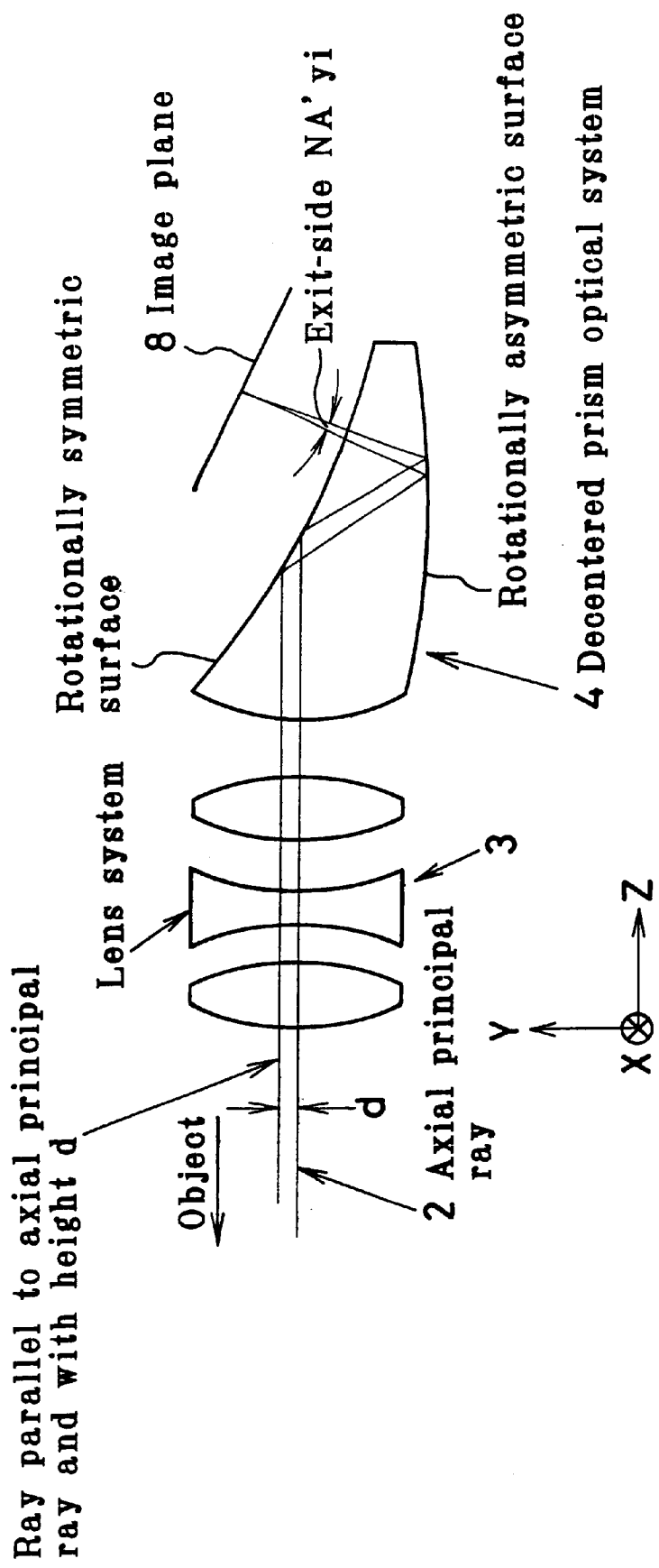
FIG. 9 is a diagram for describing the focal length of the image pickup optical system according to the present invention.

Incidentally, an image pickup optical system according to the present invention arranged as described above may be used in an image pickup apparatus such as a compact TV camera or electronic camera using, for example, a CCD as an image pickup device. FIG. 8 is a conceptual view showing an arrangement in which an image pickup optical system 40 according to the present invention is incorporated into an image pickup apparatus using a CCD 42 as an electronic image pickup device. In this image pickup apparatus, a cover glass 41 or a lens having a power is placed in front of a stop 1. An object image is formed on the CCD 42 placed in the image plane by the image pickup optical system 40 through a filter 30 (corresponding to the plane-parallel plate in Examples 1 to 5), e.g. an infrared cutoff filter, an optical low-pass filter, etc. The object image is converted into an image signal by the CCD 42. The image signal is processed by a processing device 43 and displayed directly on an LCD (liquid crystal display) 44 operating as an electronic finder. In addition, the image signal is recorded in a recording medium 45 contained in the image pickup apparatus. Further, the image pickup apparatus has a microphone 46 to record sound information at the same time as the image signal is recorded. The image pickup apparatus may be arranged such that the processing device 43 corrects distortion and other aberrations produced in the image pickup optical system 40 by using a digital image processing technique on the basis of information concerning distortion and other aberrations of the optical system 40 previously stored in the recording medium 45 or a memory or the like attached to the processing device 43.

The size and production cost of the image pickup apparatus can be reduced by reducing the number of constituent elements and size of the image pickup optical system 40 on the basis of the present invention.

As will be clear from the foregoing description, it is possible according to the present invention to provide a compact image pickup optical system satisfactorily corrected for chromatic aberration as well as decentration aberrations and capable of providing a clear image with minimal distortion even at a wide field angle by combining an image pickup optical element, which is formed from a decentered reflecting optical system, with a diffractive optical element.

What we claim is:

1. An image pickup optical system comprising
   an image pickup optical element;
   an image pickup device disposed proximate said image pickup optical element; and
   a diffractive optical element disposed between said image pickup optical element and said image pickup device, wherein said image pickup optical element and said diffractive optical element are decentered with respect to each other, wherein said image pickup optical element has at least three optical surfaces adjacent to each other, at least one of said three optical surfaces being formed from a curved surface, and at least two reflections take place between said optical surfaces, and wherein said image pickup optical element is a prism member in which a space defined by said at least three surfaces is filled with a transparent medium having a refractive index larger than 1, and wherein said prism member has three optical surfaces, said three optical surfaces including:

a first surface having a transmitting action;

a second surface having both reflecting and transmitting actions; and a third surface having a reflecting action;

wherein light from an object enters said prism member through the first surface, and the light is reflected by the second surface and further reflected by the third surface and exits from said prism member through the second surface.

2. An image pickup optical system comprising an image pickup optical element and a diffractive optical element, which are decentered with respect to each other, wherein said image pickup optical element has at least three optical surfaces adjacent to each other, at least one of said three optical surfaces being formed from a curved surface, and at least two reflections take place between said optical surfaces, and wherein the following relation is satisfied:

$$-1<F<1 \qquad (1)$$

wherein F is a value of a focal length of said image pickup optical system divided by a focal length of said diffractive optical element.

3. An image pickup optical system comprising an image pickup optical element and a diffractive optical element, which are decentered with respect to each other, wherein said image pickup optical element has at least three optical surfaces adjacent to each other, at least one of said three optical surfaces being formed from a curved surface, and at least two reflections take place between said optical surfaces, and wherein said image pickup optical element is a prism member in which a space defined by said at least three surfaces is filled with a transparent medium having a refractive index larger than 1, and wherein the following relation is satisfied:

$$-1<F<1 \qquad (1)$$

wherein F is a value of a focal length of said image pickup optical system divided by a focal length of said diffractive optical element.

4. An image pickup optical system according to any one of claims 1, 2 and 3, which satisfies the following condition:

$$-0.1<F<0.1 \qquad (1-1).$$

5. An image pickup optical system according to any one of claims 1, 2 and 3, which satisifies the following condition:

$$0<F<0.1 \qquad (1-2).$$

6. An image pickup apparatus comprising:

said image pickup optical system according to any one of claims 1, 2 and 3; and an image pickup device provided to receive an object image formed by said image pickup optical system.

7. An image pickup apparatus according to any one of claims 1, 2 and 3, wherein said image pickup device is an electronic image pickup device having a function of converting light received thereby into electrical information.

8. An image pickup apparatus according to any one of claims 1, 2 and 3, further comprising:

means for viewing the object image received by said electronic image pickup device.

9. An image pickup optical system comprising an image pickup optical element and a diffractive optical element, which are decentered with respect to each other, wherein said image pickup optical element has at least three optical surfaces adjacent to each other, at least one of said three optical surfaces being formed from a curved surface, and at least two reflections take place between said optical surfaces, and wherein said image pickup optical element is a prism member in which a space defined by said at least three surfaces is filled with a transparent medium having a refractive index larger than 1, and wherein said prism member has three optical surfaces, said three optical surfaces including:

a first surface having a transmitting action;

a second surface having both reflecting and transmitting actions; and a third surface having a reflecting action;

wherein light from an object enters said prism member through the first surface, and the light is reflected by the second surface and further reflected by the third surface and exits from said prism member through the second surface, and wherein the following relation is satisfied:

$$-1<F<1 \qquad (1)$$

wherein F is a value of a focal length of said image pickup optical system divided by a focal length of said diffractive optical element.

10. An image pickup optical system as recited in claim 1, wherein said curved surface has a rotationally asymmetric surface configuration having no axis of rotational symmetry in the surface nor out of the surface, said rotationally asymmetric surface having a totally reflecting action or a reflecting action, whereine when a light ray emanating from a center of an object and passing through a center of a pupil to reach a center of an image is defined as an axial principal ray, said rotationally asymmetric surface is tilted with respect to said axial principle ray, said rotationally asymmetric surface correcting rotationally asymmetric aberrations due to decentration by said rotationally asymmetric surface configuration, and said diffractive optical element is placed on an object or image side of said image pickup optical element.

11. An image pickup optical system as recited in claim 1, wherein the following relation is satisfied:

$$-1 < F < 1 \tag{1}$$

wherein F is a value of a focal length of said image pickup optical system divided by a focal length of said diffractive optical element.

* * * * *